United States Patent
Narayana et al.

(10) Patent No.: US 6,914,743 B1
(45) Date of Patent: Jul. 5, 2005

(54) VIBRATION CANCELLATION IN A DISK DRIVE BY USING AN ACCELERATION SENSOR AND ADAPTIVELY ADJUSTING ITS GAIN TO MINIMIZE EXTERNAL ACCELERATION EFFECTS

(75) Inventors: Aswartha Narayana, Mission Viejo, CA (US); Raffi Codilian, Irvine, CA (US); Lan V. Ngo, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 218 days.

(21) Appl. No.: 09/728,626

(22) Filed: Nov. 30, 2000

(51) Int. Cl.[7] .............................................. G11B 5/596
(52) U.S. Cl. .............................. 360/77.08; 360/77.02; 360/77.06
(58) Field of Search ............................... 360/75, 77.01, 360/77.02, 77.03, 77.04, 77.05, 77.06, 77.08

(56) References Cited

U.S. PATENT DOCUMENTS

| | | | |
|---|---|---|---|
| 5,299,075 A | * | 3/1994 | Hanks ..................... 360/77.02 |
| 5,521,772 A | * | 5/1996 | Lee et al. ..................... 360/75 |
| 5,663,847 A | * | 9/1997 | Abramovitch ........... 360/77.02 |

* cited by examiner

Primary Examiner—David Hudspeth
Assistant Examiner—Jason Olson
(74) Attorney, Agent, or Firm—Milad G. Shara, Esq.; Ramin Mobarhan, Esq.

(57) ABSTRACT

Disclosed is a disk drive using an accelerometer to sense linear vibration and cancel its effects with an adaptive algorithm during track following. The accelerometer is oriented to detect acceleration associated with torque that tends to cause the actuator to move off-track notwithstanding the efforts of the servo control system. The accelerometer's filtered output is used to modify the control effort. The disk drive uses the position error signal to adaptively filter the accelerometer's output in an effort to mathematically converge on a set of optimal filter coefficients and thereby reduce the effect of vibration that may otherwise impose a torque on the actuator.

6 Claims, 8 Drawing Sheets

VIBRATION CANCELLATION IN A DISK DRIVE BY USING AN ACCELERATION SENSOR AND ADAPTIVELY ADJUSTING ITS GAIN TO MINIMIZE EXTERNAL ACCELERATION EFFECTS

FIELD OF THE INVENTION

The present invention relates generally to magnetic disk drives and, more particularly, to a method of canceling vibration in a disk drive by using an accelerometer and adaptively adjusting its gain to minimize external acceleration effects.

BACKGROUND OF THE RELATED ART

Magnetic disk drives generally read and write data on the surface of a rotating magnetic disk with a transducer or "head" that is located at the far end of a moveable actuator. A servo control system uses servo control information recorded amongst the data, or on a separate disk, to controllably move the transducer from track to track ("seeking") and to hold the transducer at a desired track ("track following"). A detailed discussion of servo control systems is unnecessary because such systems are well known as set forth, for example, in patent application Ser. No. 09/138,841 that was filed on Aug. 24, 1998, entitled "DISK DRIVE CAPABLE OF AUTONOMOUSLY EVALUATING AND ADAPTING THE FREQUENCY RESPONSE OF ITS SERVO CONTROL SYSTEM," and is commonly owned by the assignee of this application.

The industry has previously mounted various kinds of accelerometers on the disk drive in order to sense external forces.

One example is U.S. Pat. No. 5,426,545 entitled "Active Disturbance Compensation System for Disk Drives." This patent discloses an angular acceleration sensor that comprises an opposed pair of linear accelerometers. The overall sensor package is mounted to the HDA or drive housing, as shown in FIG. 1 of the '545 patent, in order to detect and correct for angular acceleration about the axis of the balanced actuator assembly that would otherwise produce a radial position error, as shown in FIG. 2 of the '545 patent, due to the actuator's inertial tendency to remain stationary in the presence of such acceleration.

U.S. Pat. No. 5,521,772 entitled "Disk Drive with Acceleration Rate Sensing" discloses a variation on that theme in that it uses an "acceleration rate sensor" rather than a linear acceleration sensor (conventional accelerometer) or angular acceleration sensor. The sensor is mounted to the disk drive housing.

U.S. Pat. No. 5,663,847 is yet another patent disclosing an angular accelerometer in a disk drive. It is entitled "Rejection of Disturbances on a Disk Drive by Use of an Accelerometer." In FIG. 1, the '847 patent discloses an angular accelerometer that is mounted to the drive's base plate in order to sense rotational motion. The '847 patent is similar to the '545 patent in that both are addressing the problem that when the disk drive containing a balanced actuator is bumped rotationally in the plane of the disk, a position error will arise because "the actuator will retain its position in inertial space . . . " (4:19–21).

PCT Application WO 97/02532 discloses another apparent use of an accelerometer that is described therein as a "shock sensor" (See FIG. 3). This application is entitled "Disk Drive Data Protection System". According to the disclosure, the shock sensor detects "physical shocks to the disk drive which may compromise data being transferred . . . ."

The foregoing patents, however, do not effectively address the disturbance torque that may be imposed on an imbalanced actuator due to linear vibrations experienced by the disk drive during track following. There remains a need, therefore, for a disk drive with suitable provisions for canceling the effects of such vibration.

SUMMARY OF THE INVENTION

In a first aspect, the invention resides in a method of adaptively reducing an effect of vibration during the track following operation using an accelerometer to sense linear vibration and then substantially canceling its effects with an adaptive algorithm during track following. The method is effective without regard to the orientation of the imbalance within the actuator. The method is implemented in a magnetic disk drive having a head disk assembly (HDA) including a base, a rotating disk that carries position information in a plurality of servo wedges that are distributed around the disk, a rotary actuator that pivots relative to the base and carries a transducer 80 that periodically reads the position information from the servo wedges on the rotating disk, and a VCM circuit that includes a voice coil motor (VCM) that responds to a control effort signal that is periodically adjusted by a servo control system such that the transducer tends to follow a track that is defined by the position information during a track-following operation. The method comprises the steps of: mounting a sensor within the magnetic disk drive to produce a sensor signal in response to a linear vibration that tends to cause the rotary actuator to move off-track; reading the position information from a presently active servo wedge; producing a position error signal based on a difference between an indicated position signal and a target position signal; calculating a nominal control effort signal based on the position error signal; reading the sensor signal to produce a sensor value associated with the presently active servo wedge; modifying the sensor value based on a sensor gain value to produce a control effort adjustment signal; adjusting the nominal control effort signal with the control effort adjustment signal to produce an adjusted control effort signal; outputting the adjusted control effort signal to the VCM circuit; and altering the sensor gain value based on the position error signal and the sensor value associated with the presently active servo wedge for use during a next active servo wedge.

BRIEF DESCRIPTION OF THE DRAWINGS

The just summarized invention can be best understood with reference to the following description taken in view of the drawings of which.

DETAILED DESCRIPTION OF THE PREFERRED EMBODIMENT

Figure 1:
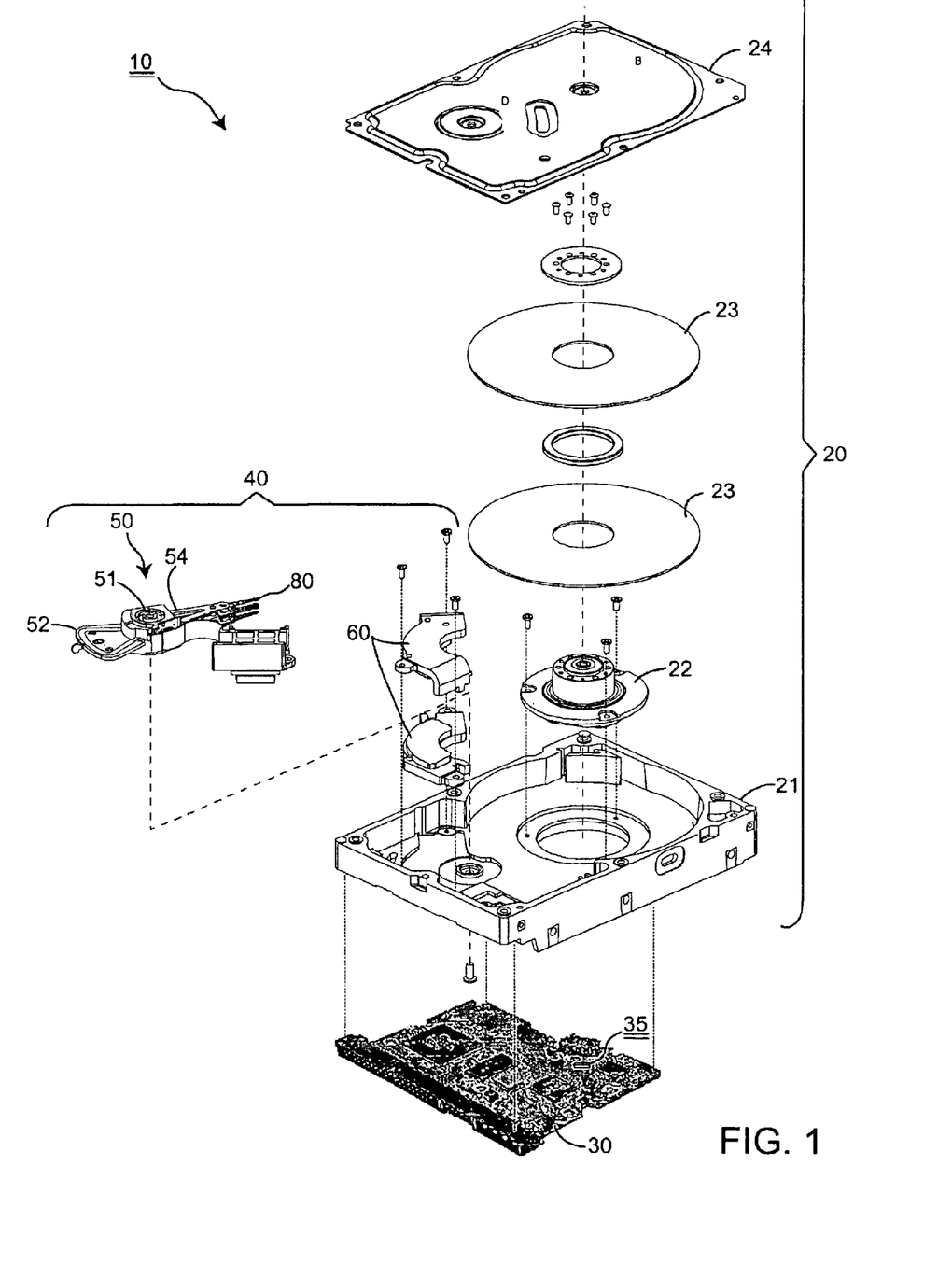
FIG. 1 is an exploded perspective view of a magnetic disk drive 10 according to a preferred embodiment of the invention, the disk drive having a head disk assembly 20 ("HDA") that contains a magnetic disk 23, a rotary actuator 50, and an acceleration sensor 35 that moves rigidly with the HDA 20.
Figure 4:
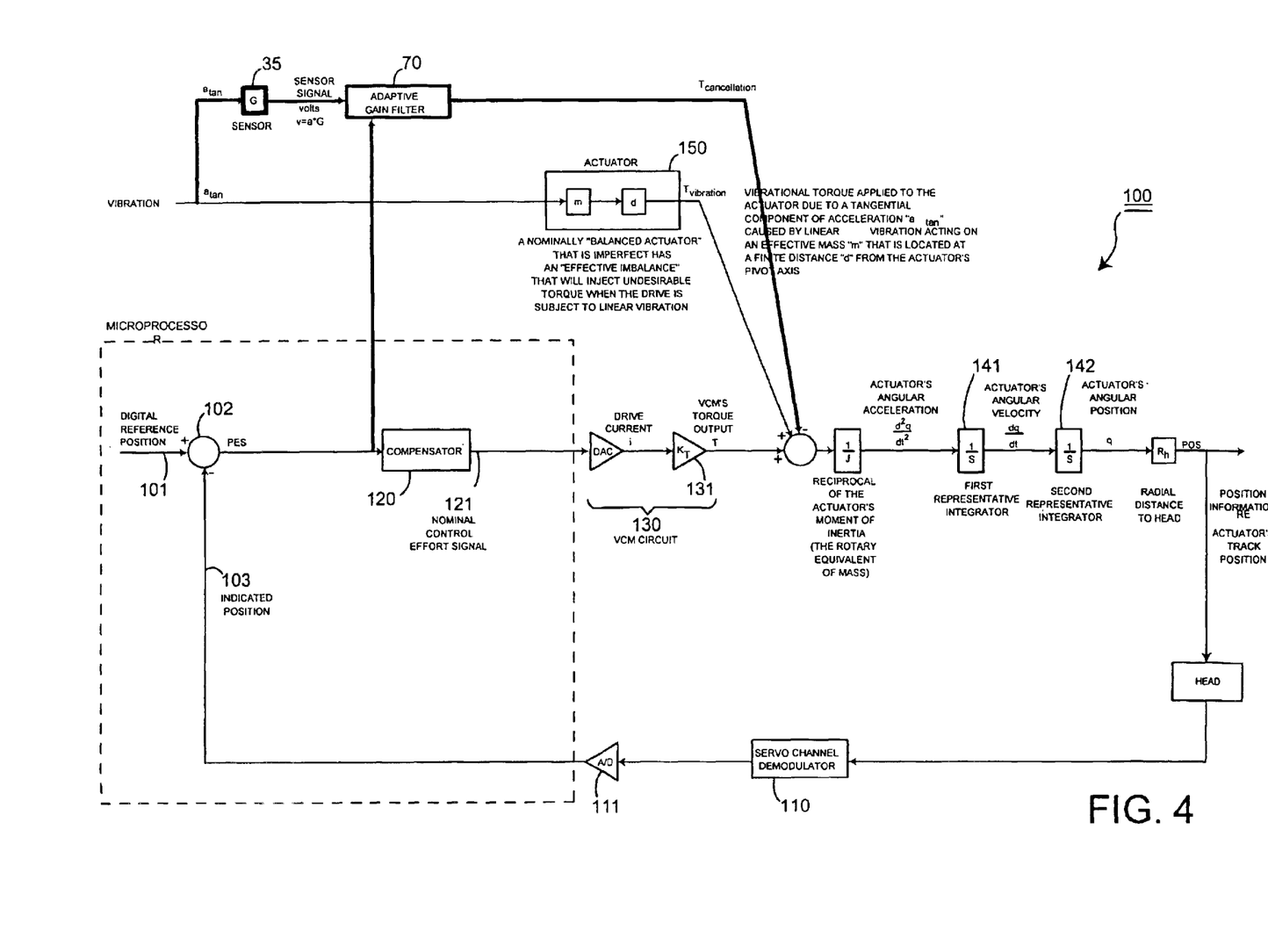
FIG. 4 is a simplified schematic diagram of the present invention that figuratively shows, in bold, how a sensor that outputs a sensor signal in proportion to the linear vibration experienced by the imbalanced actuator can be modified with an adaptive gain filter, on the basis of the PES and sensor signal associated with a presently active servo wedge, in order to produce a cancellation torque that is likely to substantially cancel the vibrational torque that would otherwise result in a movement of the actuator.
Figure 5:
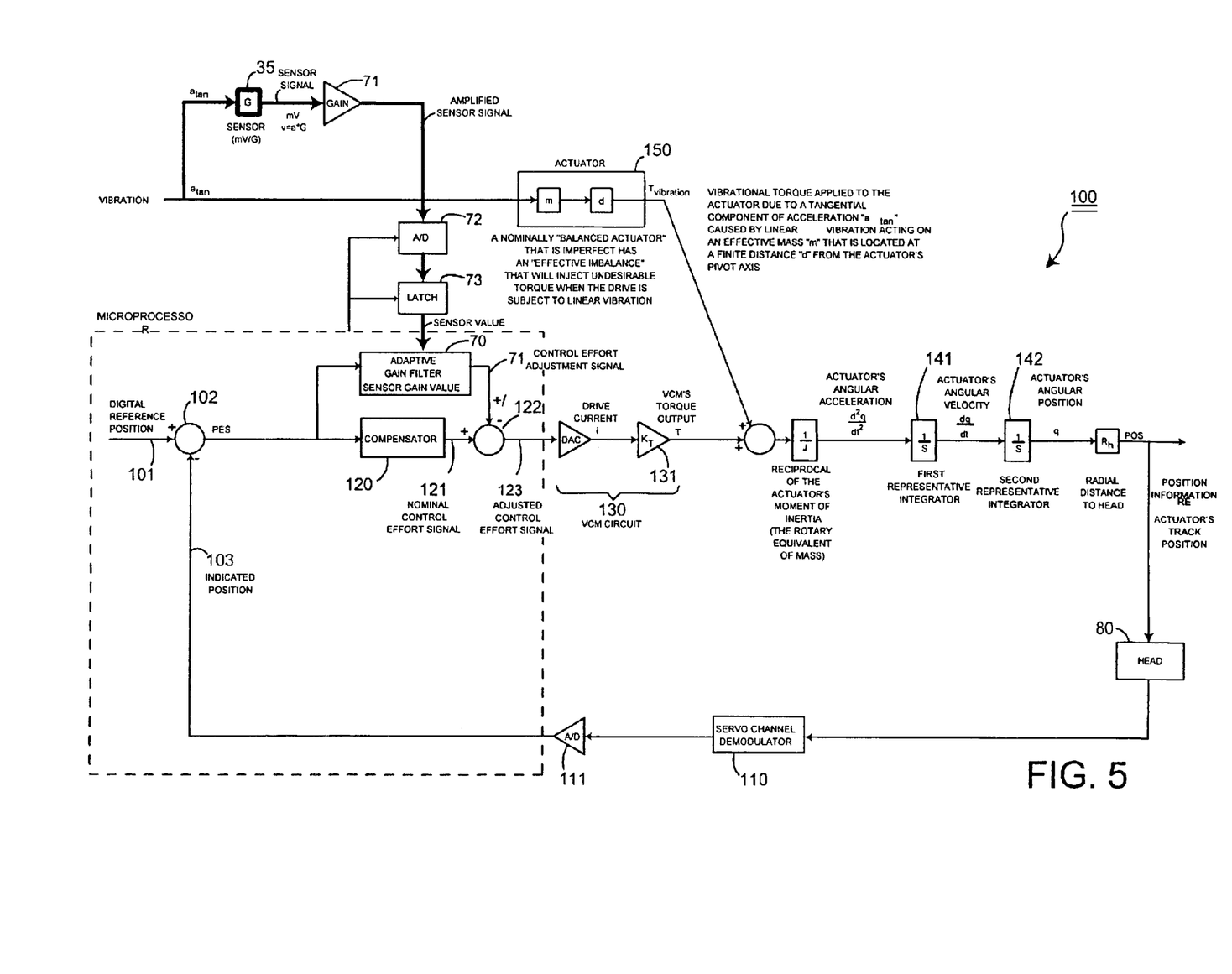
FIG. 5 is a simplified schematic diagram of a preferred embodiment of the present invention that operates in principle as shown in FIG. 4, but wherein suitable firmware that controls the microprocessor is used to implement the adaptive gain filter, the output of which is a control effort adjustment signal that is used to adjust a nominal control effort signal and produce an adjusted control effort signal 123.

FIG. 1 shows a preferred embodiment of a disk drive 10 according to this invention. The preferred embodiment of FIG. 1 is directed to using a sensor (e.g. accelerometer) 35 during track following for reducing off-tracks caused by external vibration in the disk drive's environment. The signal from the sensor 35, which is proportional to the vibration level, is conditioned by a filter and combined with a nominal control effort signal in order to cancel or reduce the effects of the vibration into the system. Although not shown herein, a notch filter or a low pass filter circuitry can minimize the effects of the sensor resonances so that the sensor signal will be representative of the pure external vibration that is being sensed. As best shown in FIGS. 4 and 5 and as discussed below, an adaptive algorithm continuously adjusts the gain (by adjusting one or multiple filter coefficients) to adjust the accelerometer signal using the position error signal (PES), as a measure of the vibration-induced accelerations.

Returning to FIG. 1, the disk drive 10 comprises a head disk assembly ("HDA") 20 including a base 21, a rotating disk 23, and a rotary actuator 50 that pivots relative to the base 21. In this embodiment, the disk drive 10 further comprises a motion sensor 35 that is rigidly mounted relative to the base 21 such that one moves with the outer. Its sense axis (not labeled) is preferably substantially aligned with a line that is tangent to the arcuate motion of the actuator 50. The sensor 35, in other words, is positioned in order to detect the same acceleration components that tend to move an actuator 50 that has an imbalance.

The preferred sensor 35 is a linear accelerometer with a single sense axis, but multi-axis sensors and other types of motion sensors altogether may also be used in accordance with this invention. Sensors of these nature are well known to those of ordinary skill in the field.

In the preferred embodiment, a Printed Circuit Board Assembly (PCBA) 30 that contains suitable control electronics is rigidly mounted to an underside of the base 21. The disk 23 is rotated by a spindle motor 22. The rotary actuator 50 rotates about a pivot axis extending through a center of a pivot cartridge 51 that secures the actuator 50 to the base 21, adjacent to the disk 23. An actuator arm 54 extends to one side in order to carry a head 80 over the disk 23 for reading and writing data therefrom and a voice coil 52 extends from the other side for interacting with a pair of permanent magnets 60. The voice coil 52 and magnets 60 are frequently regarded as a "voice coil motor", or VCM 40. A cover plate 24 encloses the foregoing components in a cavity within the base 21.

The first sensor 35 is rigidly coupled to the base 21. As shown in FIG. 1, however, it may be indirectly mounted to the base 21 by being mounted to the PCBA 30 that is itself rigidly mounted to the base 21. It is possible, of course, to mount the first sensor 35 directly to the base 21, or to mount it to any other structure that is, in turn, fixed to the base 21. The preferred embodiment will be further described below, with reference to FIGS. 4, 5 and 6. Before then, however, it is helpful to understand the configuration and operation of a typical prior art servo control system.

Figure 2:
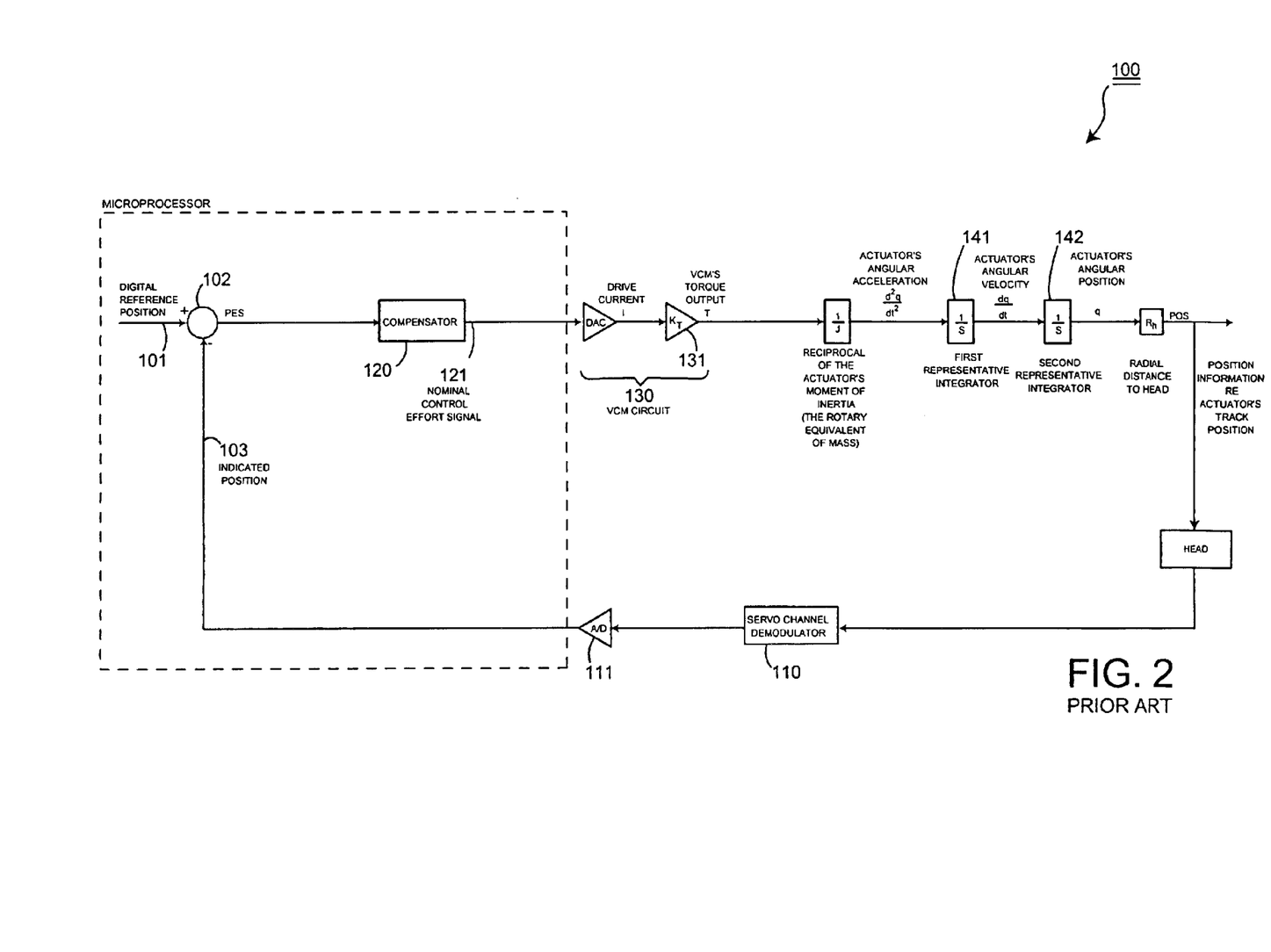
FIG. 2 is a simplified schematic diagram of a prior art, servo control system that is used to keep the transducer 80 in an on-track position while track following.

FIG. 2 is simplified diagram of a prior art control system model that is used for controlling a disk drive 10 during a track following operation.

In normal operation, the control system 100 receives a digital reference position 101 in accordance with a request from a host computer (not shown). An indicated position 103 is also available on a periodic basis by virtue of embedded servo sectors that are periodically read by the head 80 from a disk surface, processed through a servo channel demodulator 110, and converted to a digital value by an A/D converter 111.

A summing junction 102 subtracts the indicated position 103 from the target reference 101 to produce a position error signal PES that is provided to a suitable compensator 120 to produce a nominal control effort signal 121 that is provided to a VCM circuit 130 that, in the usual embodiment, includes a digital-to-analog converter DAC that produces a current "i" for accelerating the VCM 40 (see FIG. 1) in a direction and magnitude that is in accordance with the direction and magnitude of the PES.

As suggested by the gain block 131, the drive current "i" generates a torque T according to a torque conversion factor, $K_T$, where $T=i*K_T$. The applied torque, of course, accelerates the rotary actuator 50 at an angular acceleration $$\frac{d^2\theta}{dt^2}$$

that is a function of the applied torque T and the actuators angular moment of inertia J. Over time, as suggested by the simplified $$\frac{1}{S}$$

system blocks 141, 142, the acceleration $$\frac{d^2\theta}{dt^2}$$

results in an angular velocity $$\frac{d\theta}{dt}$$

and an angular position θ. A change in the angular position Δθ causes the head 80 to move along an arc as a function of the radial distance $R_h$ from the pivot cartridge 51 to the head 80. By periodically sampling the position information on the disk 23 to provide the indicated position 103, and then correcting relative to the reference position 101, the servo control system 100 endeavors to keep the head 80 located at a particular track position POS over the disk 23—a process known as "track following."

The rotary actuator 50 shown in FIG. 1 is a nominally "balanced actuator" in that the center of mass is designed to be located precisely at the pivot axis such that linear accelerations will not generate a relative acceleration between the actuator 50 and the base 21. As a practical matter, however, many rotary actuators 50 are shipped with an operational or effective imbalance even though they are nominally balanced.

Figure 3:
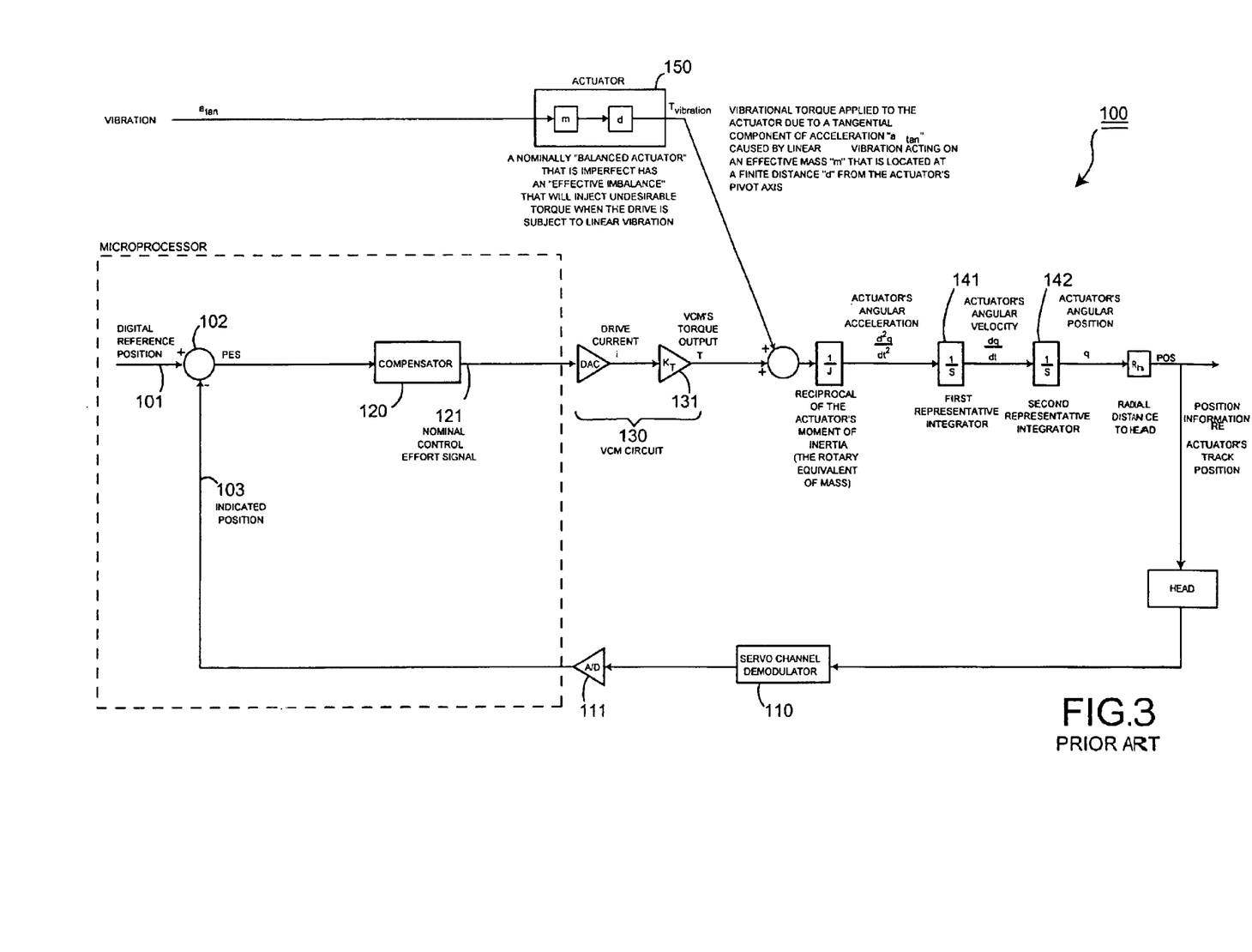
FIG. 3 is a simplified schematic diagram that is similar to FIG. 2, but showing how vibration acting on an imbalanced actuator can impart a vibrational torque that increases track following error.

FIG. 3 is similar to FIG. 2 except that it also includes a block 150 that represents the input from an actuator 50 with an effective imbalance. As suggested by block 150, an actuator 50 with an effective imbalance has a center of mass located at some distance d from the pivot axis. Such an actuator 50 is detrimentally subject to an angular acceleration whenever a linear shock or vibration imparts a force to the off-axis mass. Such an actuator 50, of course, is subject to an acceleration $a_{tan}$ in the presence of a linear vibration with a component of motion that is tangent to the actuator's arcuate movement. As shown, therefore, the imbalanced actuator 50 will experience a disturbance torque input $T_{vib}$ that increases track following error.

The result is the injection of an undesired torque $T_{vib}$ that tends to cause the head 80 to move off-track even while the servo control system is in a track-following mode. An inability to control the actuator 50 in the face of such undesired vibration detrimentally requires a coarser track pitch design than might otherwise be used, makes it possible that the system has to re-read a data track, and makes it possible that the head 80 will over-write an adjacent track when recording data.

Figure 6A:
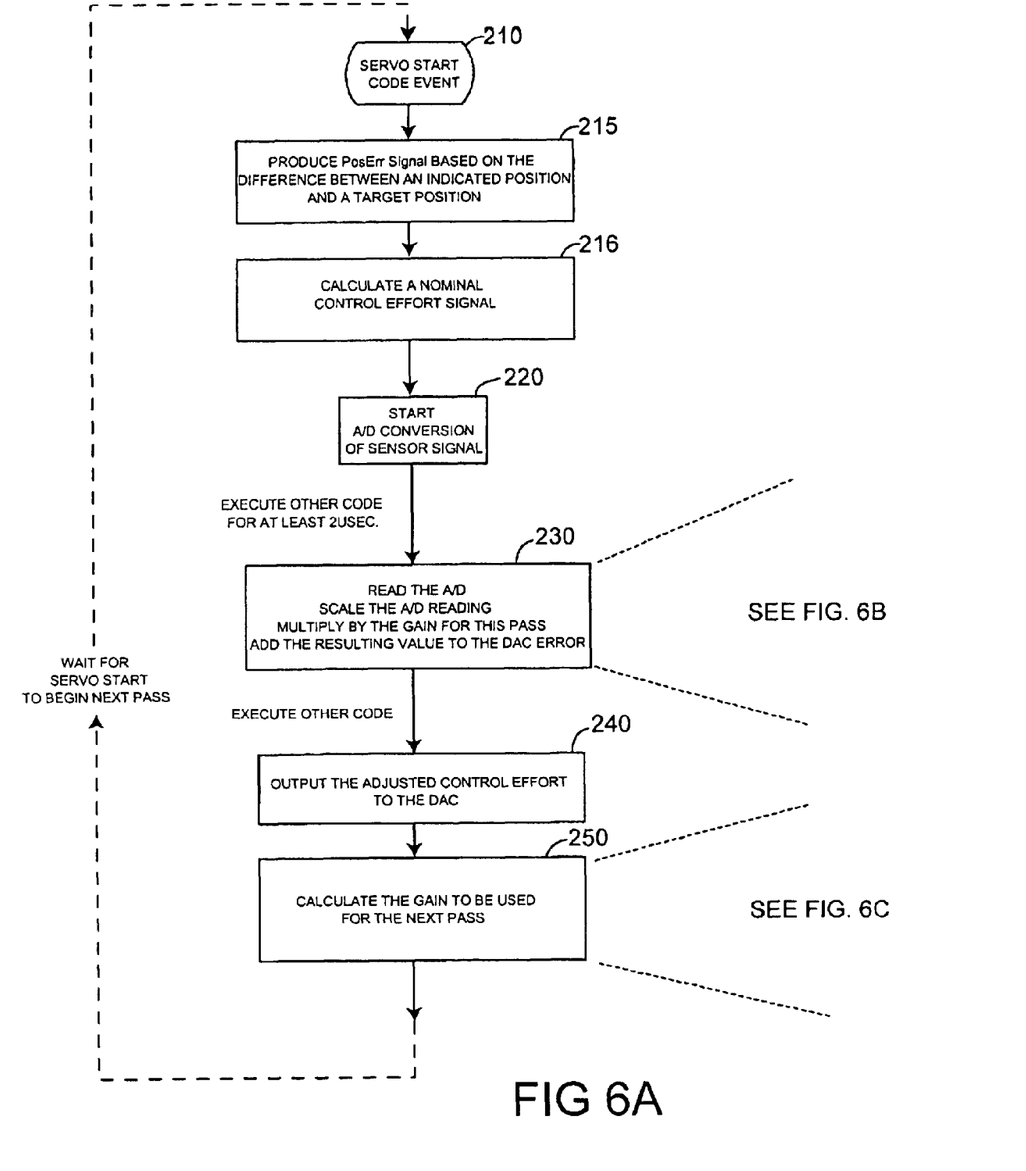
FIG. 6A is a flowchart of a periodic servo control routine that implements the preferred embodiment and is executed in response to a servo start code event corresponding with the detection of a servo sample.
Figure 6B:
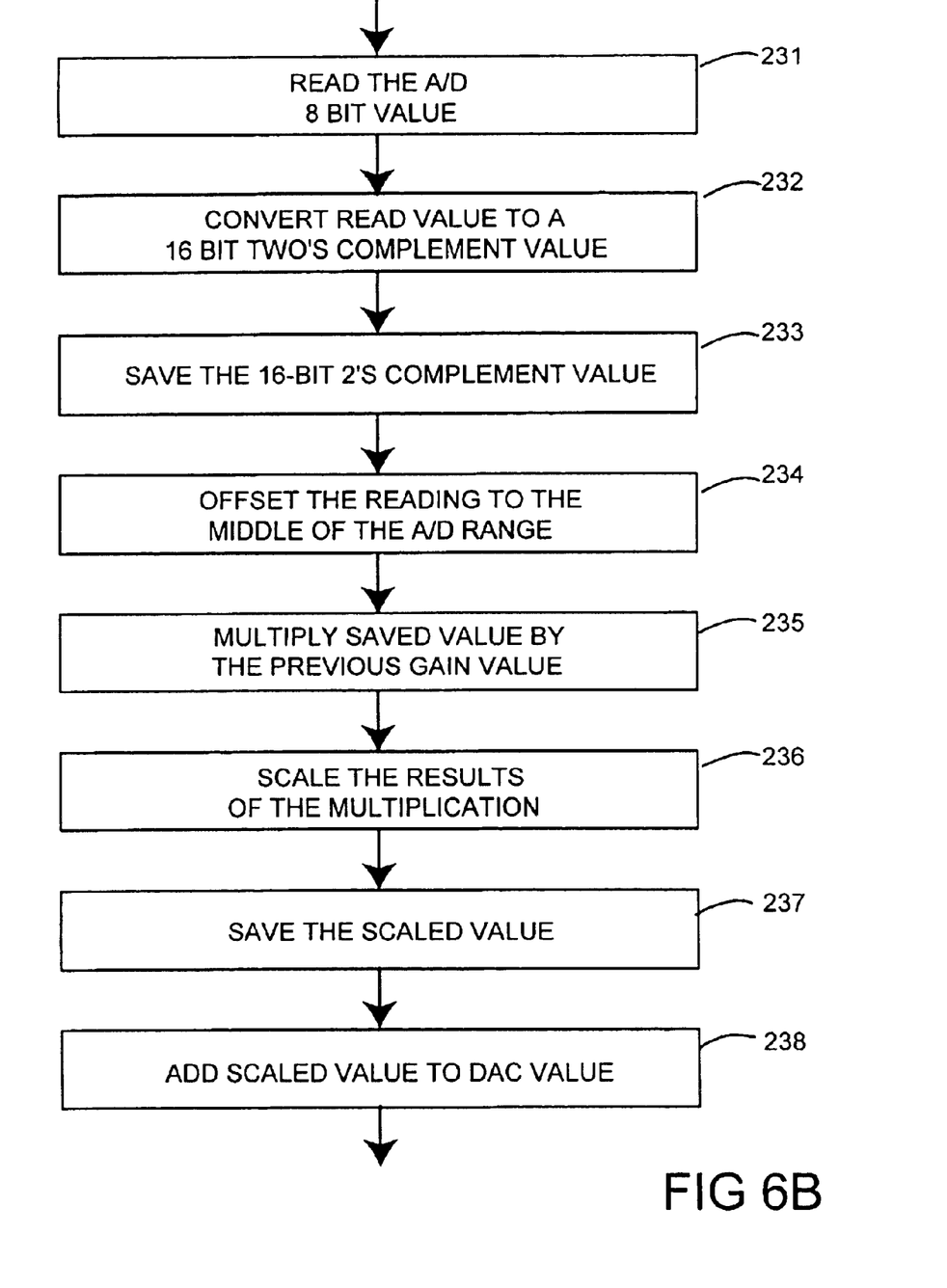
FIG. 6B is a flow chart with a more detailed depiction of the steps that make up step 230 of FIG. 6A.
Figure 6C:
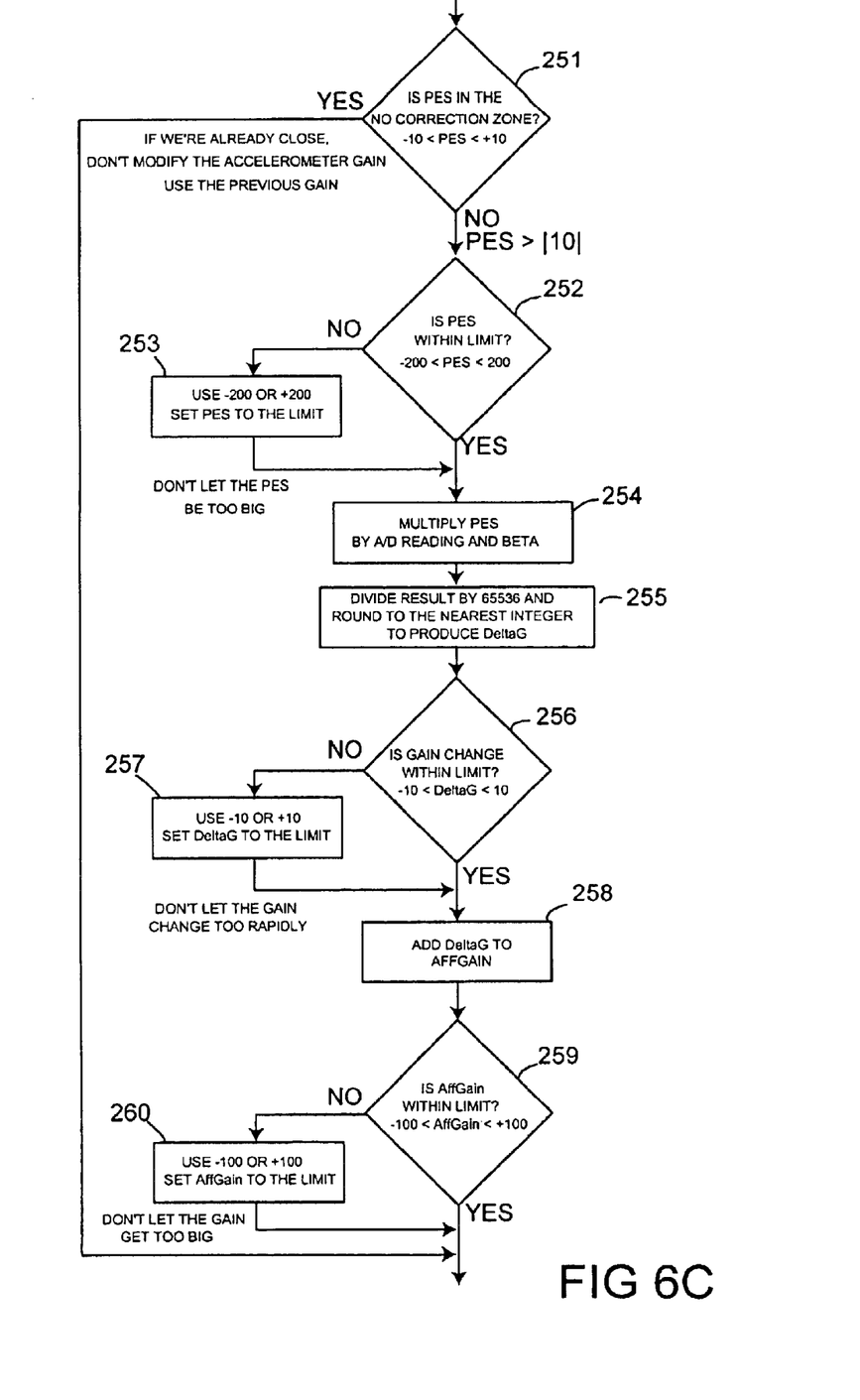
FIG. 6C is a flow chart with a more detailed depiction of the steps that make up step 250 of FIG. 6A.

We now turn to FIGS. 4, 5 and 6 that represent the preferred embodiment with increasing degrees of specificity.

FIG. 4 is a simplified schematic diagram that shows how the preferred embodiment uniquely uses the PES as an indication of how much impact vibration is having for a given gain, an adaptive gain filter 70 being adjusted accordingly. In particular, as emphasized by the bolder lines, this embodiment uses a sensor 35 that outputs a sensor signal in proportion to the vibration experienced by the imbalanced actuator 150 to modify the adaptive gain filter 70, on the basis of the PES and the sensor signal associated with a presently active servo wedge, in order to produce a cancellation torque $T_{cancellation}$ that is likely to substantially cancel the vibrational torque $T_{vib}$ that would otherwise result in a movement of the actuator 150. In this context, a presently active servo wedge refers to control efforts made in response to a present servo sample and a next active servo wedge refers to control efforts made in response to a subsequent servo sample.

FIG. 5 is a simplified schematic diagram of the preferred embodiment that operates in principle as shown in FIG. 4, but wherein suitable firmware that controls the microprocessor is used to implement the adaptive gain filter, the output of which is a control effort adjustment signal that is used to adjust a nominal control effort signal 121 and produce an adjusted control effort signal 123. As shown, the preferred embodiment includes an amplifier circuit 71 that increases the amplitude of the sensor's output signal, an A/D converter 72 that periodically samples the amplified sensor signal as directed by the microprocessor, and a latch 73 that stores a digital value output by the A/D converter 72 for provision to the adaptive gain filter 70 as a sensor value. The adaptive gain filter 70, therefore, receives a sensor value and a PES and outputs the control effort adjustment signal. The operation of the preferred embodiment will be best understood with reference to the following description taken together with the flowcharts of FIG. 6A-6C.

Overview—FIG. 6A

FIG. 6A is a flowchart of a periodic servo control routine that implements the preferred embodiment and is executed in response to a servo start code event corresponding with the detection of a servo sample. The depicted process is intended for use in a disk drive 10 like that exemplified by FIGS. 1 and 5, i.e. for use in a magnetic disk drive having a head disk assembly (HDA) 20 including a base 21, a rotating disk 23 that carries position information in a plurality of servo wedges that are distributed around the disk, a rotary actuator 50 that pivots relative to the base and carries a transducer 80 that periodically reads the position information from the servo wedges on the rotating disk, and a VCM circuit 130 that includes a voice coil motor (VCM) 40 that responds to a control effort signal that is periodically adjusted by a servo control system such that the transducer tends to follow a track that is defined by the position information during a track-following operation. As shown, the depicted process is a method of adaptively reducing an effect of vibration during the track following operation comprising several steps.

The method involves mounting a sensor 35 within the magnetic disk drive 10 to produce a sensor signal in response to a vibration that tends to cause the rotary actuator 50 to move off-track. This particular step is shown in FIGS. 1 and 5, but not in FIG. 6.

Step 210 represents the step of reading the position information from a presently active servo wedge. At step 210, after this portion of the firmware has been sitting idle or performing background tasks since processing some earlier servo information, a servo start code event has occurred. This generally corresponds to a "servo interrupt" that is triggered by the detection of a servo sync mark that indicates the beginning a servo sample. Implicit in step 210 are the conventional processes of reading the gray code that generally represents a track ID and the servo bursts that generally represent fractional track position.

Step 215 represents the step of producing a position error signal (PES) based on a difference between the indicated position signal 103 and the reference position signal 101. Any suitable manner of producing a PES may be used.

Step 216 represents the step of calculating a nominal control effort signal based on the position error signal. As with step 215, any suitable manner of calculation may be used. The preferred embodiment uses a digital compensator 120 that is implemented in or controlled by the microprocessor, but other approaches may be used, both digital and analog.

Step 220 represents the prerequisite step of starting an A/D conversion of the sensor signal output by the sensor 35. As noted above with reference to FIG. 5, this step preferably proceeds by sampling, digitizing and then latching an amplified sensor signal that is derived from the acceleration sensor 35. This takes a finite amount of time, so other code may be executed during this time.

Step 230, as shown in more detail in FIG. 6B discussed further below, represents the several steps of reading 231 the sensor signal to produce a sensor value associated with the presently active servo wedge, modifying 235 the sensor value based on a sensor gain value to produce a control effort adjustment signal, and adjusting 238 the nominal control effort signal with the control effort adjustment signal to produce an adjusted control effort signal 123.

Step 240 represents the step of outputting the adjusted control effort signal 123 to the VCM circuit 130.

Step 250, as shown in more detail in FIG. 6C discussed further below, represents the step of altering the sensor gain value based on the position error signal and the sensor value associated with the presently active servo wedge for use in a next active servo wedge. Step 250 is a "post processing" step in that it takes place after the output of the control effort.

Step 230 Details—FIG. 6B

FIG. 6B is a more detailed flow chart showing the sub-steps that make up step 230 of FIG. 6A.

At step 231, the system reads the sensor value (i.e. sensor measurement old) that was provided via the A/D converter 72 and the latch 73. In the preferred embodiment, the value is provided with 8-bits of resolution.

At steps 232–233, the system converts the read value to a 16-bit two's complement value and saves that value.

At step 234, the system offsets the reading to the middle of the A/D range to provide a function of the sensor signal value which is named "AffDAC" for use as explained below.

At step 235, the system multiplies the saved value by a previous gain value, i.e. a gain value derived in connection with a servo sample from a previously active servo wedge.

At steps 236–237, the system scales the results of the multiplication to 14-bits of resolution to match the resolution of the DAC in the VCM circuit 130 and saves the scaled value. The scaled value corresponds to the "control effort adjustment signal" of FIG. 5.

At steps 238, the system adds the scaled value to the DAC value. This corresponds to FIG. 5's depiction of providing the control effort adjustment signal 71 to the nominal control effort signal 121, via a summing junction 122, to produce the adjusted control effort signal 123.

Returning to step 240 in the overview flow chart of FIG. 6A, and referring to FIG. 5, the adjusted control effort signal 123 is output to the DAC in the VCM circuit 130.

Step 250 Details—FIG. 6C

FIG. 6C is a more detailed flow chart showing the sub-steps that make up step 250 of FIG. 6A. This is the part of the system where the gain value may be recalculated or altered for use in a next active servo wedge on the basis of the PES and gain value associated with a presently active servo wedge.

As explained elsewhere, the system updates the adaptive gain filter 71 in order to converge on a most optimal set of coefficients or gain value. The preferred system implements the convergence according to a Least Mean Square(LMS) algorithm, but other approaches may be used. Using the LMS approach, the preferred system (1) takes the old coefficient (called AFFGain in the actual code) and (2) modifies it up or down with an adjustment factor (called DeltaG in the actual code) that is computed on the basis of the PES, as suggested by the following equation:

Filter coeff new=(Filter coeff old)−(Convergence rate) (PES old) (Function(Sensor Measurement Old)) where Function(Sensor Measurement Old)=AffDAC Using the variable names from the actual code, the foregoing convergence equation may be rewritten as:

$AffGain_{NEW}=AffGain_{OLD}-BETA*PES_{OLD}*AffDac$

In other words, the new A/D value (Sensor measurement) contained in the latch 73 is partially factored into the actual gain value used in a particular servo wedge based on the predetermined value of BETA (preferably 50 counts from an 8-bit range of 250) and the PES value from a prior servo wedge (usually the immediately prior wedge).

At step 251, the preferred system checks to see if the PES is in a "NO CORRECTION ZONE" defined as +/−10 counts from track center. If "yes," such that actuator 50 is very nearly on track, then the system continues to the bottom of the flow diagram without modifying the gain value. If "no," however, then flow proceeds to step 252.

At step 252, the system clamps the PES to a reasonable value for use in updating the gain value. In the preferred system, the value of PES used to alter the gain value is limited to +/−200 counts. If the PES is not within limit, flow proceeds through step 253 where either +200 or −200 is substituted for the actual PES. If the PES is within limit (i.e. larger than |+/−10| but smaller than |+/−200|), then flow proceeds directly to step 254.

At step 254, the system multiples PES by the A/D reading from the sensor 35 (see steps 231–234 in FIG. 6B) and by a combination factor BETA. This corresponds to the terms to the right hand side of the "−" sign in the following equation:

$AffGain_{new}=AffGain_{old}-BETA*PES_{old}*AffDac$

At step 255, the system divides the step 254 result by 65536 ($2^{16}$) and rounds to the nearest integer to produce DeltaG, the nominal gain change based on BETA and the PES. DeltaG may be mathematically regarded (save for the rounding) in light of the prior equation as follows:

$DeltaG=BETA*PES_{old}*AffDac$

At step 256, the system checks to see if the gain change DeltaG is within limits defined as +/−10 counts. If "no," flow proceeds to step 258 via step 257 where the gain change DeltaG is camped to +10 or −10 as required. If "yes," then flow proceeds directly to step 258.

At step 258, the system adds Delta G to the old gain $AffGain_{old}$ to produce the new gain $AffGain_{new}$ as follows:

$AffGain_{new}=AffGain_{old}+DeltaG$

At step 258, the system checks to see that the new gain $AffGain_{new}$ is within limits defined as +/−100 counts. If "no," then flow proceeds back to FIG. 6A via step 260 where the new gain $AffGain_{new}$ is clamped to +100 or −100 as appropriate. If "yes," then flow proceeds directly back to FIG. 6A. In either case, a new gain value $AffGain_{new}$ is ready for use in the adaptive gain filter 70 during processing of the position information associated with a next active servo wedge.

The Development of the Preferred Convergence Equation

The mathematical theory used to develop the above convergence equation is as follows. First, the inventors defined adaptive filter algorithm which can converge on the correct (or most optimal gain). The preferred algorithm is based on the Least Means Squared algorithm (LMS for short).

Simply, this algorithm can be defined as:

$W(present)=W(old)-[\beta*e(old)*X(old)]$ where

W is the vector of a digital FIR (Finite Impulse Response) filter gain, which modifies the Accelerometer output value.

β=convergence rate; larger values cause faster convergence, but can cause instability.

e=position error signal

X=accelerometer output

The theory behind the LMS comes from "gradient search approach" as described by Midway & McCool 76. In this approach, the goal is to minimize a "cost function" J by adjusting the filter gain using the gradient of the cost function. This leads to:

$$\text{filter gain new} = \text{filter gain old} - \beta \frac{dJ}{d(\text{filter gain})}$$

where:
β is convergence rate; and
J is the cost function which is defined to be PES² in our case. (PES² will result in +PES and −PES values being minimized)

Assuming N filter parameters, this equation can be written in more general terms as:

$$W(k+1)=W(k)-\beta \nabla_W(J_{WHEN\ J\ =J(k)})\ k \geq 0$$

where:
$\nabla_W(J)$ is the gradient of J with respect to W
Note: if W is a scalar, then $$\nabla_W(J) = \frac{dJ}{dW}$$

and if W=(w₁, w₂), then $$\nabla_W(J) = \frac{dJ}{dw_1} + \frac{dJ}{dw_2}$$

i.e., if the filter has more than one coefficient, this approach will update all of the filter coefficients since:

$$J=e^2(k)=PES^2(k)$$

$$W(k+1)=W(k)-\beta \nabla_W(e^2(k))$$

Where W(k)=[W₁(k), W₂(k), . . . W_N(k)]

Error, or e(k), can be viewed as the difference between a reference signal (d(k)) and filter output y(k), i.e. e(k)=d(k)−y(k).

Filter output y(k) is obtained as $W^tX$ since it is the dot product of filter gain vector W and sensor signal regression vector X, i.e.

$$X(k)=[x(k),x(k-1),x(k-2) \ldots x(k-N+1)]$$

then $e(k)=W^t(k)X(k)-d(k)$ rewriting:

$$W(k+1)=W(k)-\beta 2e(k)\nabla_W e(k)=W(k)-\beta 2e(k)\nabla_W W^t(k)X(k)-(d(k))$$

Since reference d(k) is not affected by filter changes, $$\nabla_W(d(k))=0$$

Similarly, X is not affected by filter coefficients, hence:

$$\nabla_W(W^t(k)X(k))=X(k)$$

Therefore:

$$W(k+1)=W(k)-\beta 2e(k)[X(k)-0]=W(k)-2\beta e(k)X(k)$$

These results are similar in the LMS algorithm presented earlier where 2β is replaced by β.
Then we arrive at $$W(k+1)=W(k)-\beta e(k)X(k)$$

which is similar to:

(Filter coeff new)=(Filter coeff old)−(Convergence rate) (*PES* (old)) Function(Sensor Measurement (Old))

and to $$\text{AffGain}_{NEW}=\text{AffGain}_{OLD}-BETA*PES_{OLD}*AffDac$$

We claim:

1. In a magnetic disk drive having a head disk assembly (HDA) including a base, a rotating disk that carries position information in a plurality of servo wedges that are distributed around the disk, a rotary actuator that pivots relative to the base and carries a transducer that periodically reads the position information from the servo wedges on the rotating disk, a VCM circuit that includes a voice coil motor (VCM) that responds to a control effort signal that is periodically adjusted by a servo control system such that the transducer tends to follow a track that is defined by the position information during a track-following operation, a method of adaptively reducing an effect of vibration during the track following operation comprising:

mounting a sensor within the magnetic disk drive to produce a sensor signal in response to a vibration that tends to cause the rotary actuator to move off-track;

reading the position information from a presently active servo wedge;

producing a position error signal based on a difference between an indicated position signal and a target position signal;

calculating a nominal control effort signal based on the position error signal;

reading the sensor signal to produce a sensor value associated with the presently active servo wedge;

modifying the sensor value based on a sensor gain value to produce a control effort adjustment signal;

adjusting the nominal control effort signal with the control effort adjustment signal to produce an adjusted control effort signal;

outputting the adjusted control effort signal to the VCM circuit; and altering the sensor gain value via an adaptive gain filter having multiple coefficients wherein the altering is based on the position error signal and the sensor value associated with the presently active servo wedge for use during a next active servo wedge.

2. The method of claim 1 wherein the VCM circuit further includes a DAC and wherein the outputting the adjusted control effort signal to the VCM circuit comprises:

providing the adjusted control effort signal to the DAC; and outputting an analog control effort signal that corresponds to the adjusted control effort signal from the DAC to the VCM.

3. The method of claim 1 wherein the modifying the sensor value based on a sensor gain value to produce a control effort adjustment signal is accomplished by multiplying the sensor value by the gain value.

4. The method of claim 1 wherein the adjusting the nominal control effort signal with the control effort adjustment signal to produce an adjusted control effort signal is accomplished by adding the control effort adjustment value to the nominal control effort value.

5. The method of claim 1 wherein the vibration is a linear vibration.

6. The method of claim 5 wherein the rotary actuator exhibits an effective imbalance that is affected by the linear vibrations.

* * * * *